United States Patent [19]

Moerke

[11] Patent Number: 4,582,979
[45] Date of Patent: Apr. 15, 1986

[54] ARC WELDING SYSTEM AND DOCKING ASSEMBLY THEREFOR

[76] Inventor: Delford A. Moerke, 1020 Shady Oak Dr., North Mankato, Minn. 56001

[21] Appl. No.: 648,966

[22] Filed: Sep. 10, 1984

[51] Int. Cl.[4] .................................................. B23K 9/00
[52] U.S. Cl. ............................ 219/137.63; 219/137.2; 219/137.9
[58] Field of Search ............ 219/137.2, 137.62, 137.63, 219/137.31, 137.9, 125.1

[56] References Cited

U.S. PATENT DOCUMENTS

| | | | |
|---|---|---|---|
| 3,324,225 | 6/1967 | Thostrup | 219/137.42 X |
| 3,496,328 | 2/1970 | Moerke | 219/137.42 |
| 3,775,584 | 11/1973 | Moerke | 219/137.63 |
| 3,783,233 | 1/1974 | dal Molin | 219/137.62 |
| 3,803,381 | 4/1974 | Bernard et al. | 219/137.42 |
| 4,158,763 | 6/1979 | Moerke | 219/137.42 |
| 4,210,796 | 7/1980 | Moerke | 219/137.63 |
| 4,418,266 | 11/1983 | Rosenbeck et al. | 219/125.1 X |

FOREIGN PATENT DOCUMENTS

| | | | |
|---|---|---|---|
| 74430 | 3/1983 | European Pat. Off. | 219/137.9 |
| 2017123 | 12/1971 | Fed. Rep. of Germany | 219/137.2 |

Primary Examiner—C. L. Albritton
Assistant Examiner—C. M. Sigda
Attorney, Agent, or Firm—Emrich & Dithmar

[57] ABSTRACT

In a MIG arc welding system, a cylindrical docking body having four utilities passages therethrough is mountable in a socket at the welding station. A positioning ring on the body limits the depth of insertion in the socket. Input connectors at one end of the body accept incoming utilities such as consumable wire electrode, shielding gas, welding potential and cooling water. At the other end of the body, the passages for shielding gas and electrode wire communicate with an output fixture, which is internally threaded to receive a contact tip assembly. Plug-type water fittings on a nozzle assembly are receivable in receptacles in the docking body which communicate with the water passages, actuator tips on the fittings actuating normally-closed, spring-biased check valves in the passages to prevent leakage of water from the docking body when the nozzle assembly is demounted. The nozzle assembly is held in place by a coupling nut threadedly engaged with the docking body.

There are provided both a fixed-mount embodiment, wherein all utilities but the welding wire enter the docking body radially, and a remote or movable mount embodiment, wherein all utilities enter the docking body axially.

20 Claims, 25 Drawing Figures

ARC WELDING SYSTEM AND DOCKING ASSEMBLY THEREFOR

REFERENCE TO RELATED APPLICATION

The present invention is an improvement of the invention disclosed and claimed in my copending U.S. application Ser. No. 648,967, entitled "ARC WELDING SYSTEM AND DOCKING ASSEMBLY THEREFOR", filed on even date herewith, the disclosure of which application is incorporated herein by reference. The docking assembly of that application may be used interchangeably with the present invention in the same system.

BACKGROUND OF THE INVENTION

The present invention relates to welding apparatus and systems, particularly Metal Inert Gas ("MIG") arc welding systems. The invention relates particularly to arc welding systems of the type utilized in mechanized and robotic welding.

Typically, a MIG welding system includes a welding gun or torch assembly which feeds a consumable wire electrode through a current pick-up tip which applies welding potential to the electrode. Such welding gun assemblies may, for example, be of the types disclosed in my U.S. Pat. Nos. 3,496,328 and 3,775,584. The gun assembly includes a main body or housing to which is removably mounted a welding nozzle which surrounds the welding tip and channels an inert shielding gas to the welding arc. The nozzle may be air or water cooled. The welding gun assembly must be serviced with the utilities which it requires for operation, such as water for nozzle cooling, gas for shielding the welding arc and electricity to effect the welding, as well as being provided with the consumable wire electrode. All of these utilities are fed to the welding gun assembly from associated supplies via utilities delivery means, which may include a portable utilities station of the type disclosed in my U.S. Pat. No. 4,210,796.

When the welding system is to be utilized in mechanized or automated applications, the welding gun assembly is fixedly mounted on the automated welding control equipment. For example, the welding gun assembly may be mounted on a permanent fixed mount to which workpieces are delivered for welding or, alternatively, might be mounted on a movable mount such as that of a robotic welding machine, which moves to the workpiece under remote control, and which may be pre-programmed.

In such prior welding systems, the replacement of the welding gun assembly or parts thereof is extremely inconvenient, particularly in the automated or robotic applications. Thus, for example, in the event of system malfunction or damage to the welding gun assembly, it is necessary to replace the complete assembly, including all the utilities delivery means all the way back to the wire drive system. This is a very costly procedure, not only because it is time consuming, but also because it may, particularly in factory applications, require the involvement of several different tradesmen, such as electricians, plumbers, welders and the like.

Furthermore, in robotic welding applications, the replaced welding gun assembly will not be in precisely the same location and orientation with respect to the robot unit as was the original gun assembly. Since this precise positioning is critical to maintenance of a pre-programmed welding path, the system must be recalibrated at the cost of additional time and labor.

The aforementioned U.S. application Ser. No. 648,967 discloses a docking assembly for a welding system, which permits the welding gun or torch assembly to be easily manually replaced at the welding station, without affecting the utilities delivery means upstream of the welding station, and without losing the precise positioning of the gun assembly in the system.

However, there are many occasions when only the nozzle assembly needs to be replaced, and not the entire gun assembly. For example, in normal operation the nozzle assembly may become clogged or fouled with spattering from the welding operation, thereby impeding the flow of shielding gas through the nozzle assembly to the welding arc. In such instances, it is necessary to shut down the welding operation to either clean the nozzle assembly in place, or replace it with a new nozzle assembly. While the nozzle assemblies of prior art welding guns, including the nozzle assemblies disclosed in the aforementioned copending application Ser. No. 648,967, can be removed, this cannot be done easily, particulary in the case of water-cooled nozzles. Thus, water cooled nozzles are provided with water conduits which are coupled to the rest of the gun assembly by threaded fittings which must be disconnected with the use of a wrench or other suitable tool. Furthermore, the supply of cooling water must be shut down at the source during such nozzle replacement to avoid extensive water spillage at the welding station. Such spillage can be extremely troublesome, particularly in the case of aluminum welding, since water is a source of hydrogen which seriously impairs the formation of porosity-free weldments in aluminum.

SUMMARY OF THE INVENTION

It is a general object of the present invention to provide an improved welding system which avoids the disadvantages of prior systems while affording additional structural and operating advantages.

An important object of the invention is the provision of a docking assembly which permits a water cooled welding nozzle assembly to be mounted and demounted at a welding station, without affecting the utilities delivery means upstream of the welding station.

In connection with the foregoing object, it is another object of this invention to provide a docking assembly of the type set forth which permits the use of a number of manually interchangeable welding nozzle assemblies.

Still another object of the invention is the provision of a docking assembly which permits ready mounting and demounting of a water-cooled welding nozzle assembly at the welding station without spillage of cooling fluid.

In connection with the foregoing objects, another object of the invention is the provision of a docking assembly of the type set forth, which can be substituted for other docking assemblies without loss of accurate positioning of the nozzle assembly in the system.

Yet another object of the invention is the provision of a docking body for use in a docking assembly of the type set forth.

These and other objects of the invention are attained by providing a docking assembly for an arc welding system including a tip assembly for guiding a wire electrode to an associated workpiece at a welding station and applying welding voltage to the electrode, a fluid-cooled nozzle assembly surrounding the tip assembly for channeling a shielding gas to the welding arc, and utilities delivery means for delivering to the welding station utilities such as welding voltage, arc shielding gas, consumable wire electrode and cooling fluid, the docking assembly comprising: a docking body disposed at the welding station and having utilities passages therethrough, means connecting the docking body to the associated utilities delivery means and receiving the wire electrode and the fluid utilities into the passages, an output fixture carried by the docking body and communicating with selected ones of the passages for passing consumable wire electrode and shielding gas from the docking body, means on the output fixture for removably mounting the tip assembly thereon in a use configuration receiving the wire electrode into the tip assembly, first coupling means on the docking body, and second coupling means on the nozzle assembly, the first and second coupling means being manually removably engageable with each other without the use of tools for mounting the nozzle assembly on the docking body in a mounted condition in surrounding relationship with the tip assembly for receiving the shielding gas and the cooling fluid, whereby the nozzle assembly can readily be mounted and demounted at the welding station without affecting the utilities delivery means upstream of the welding station.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figures 1, 2, 3:
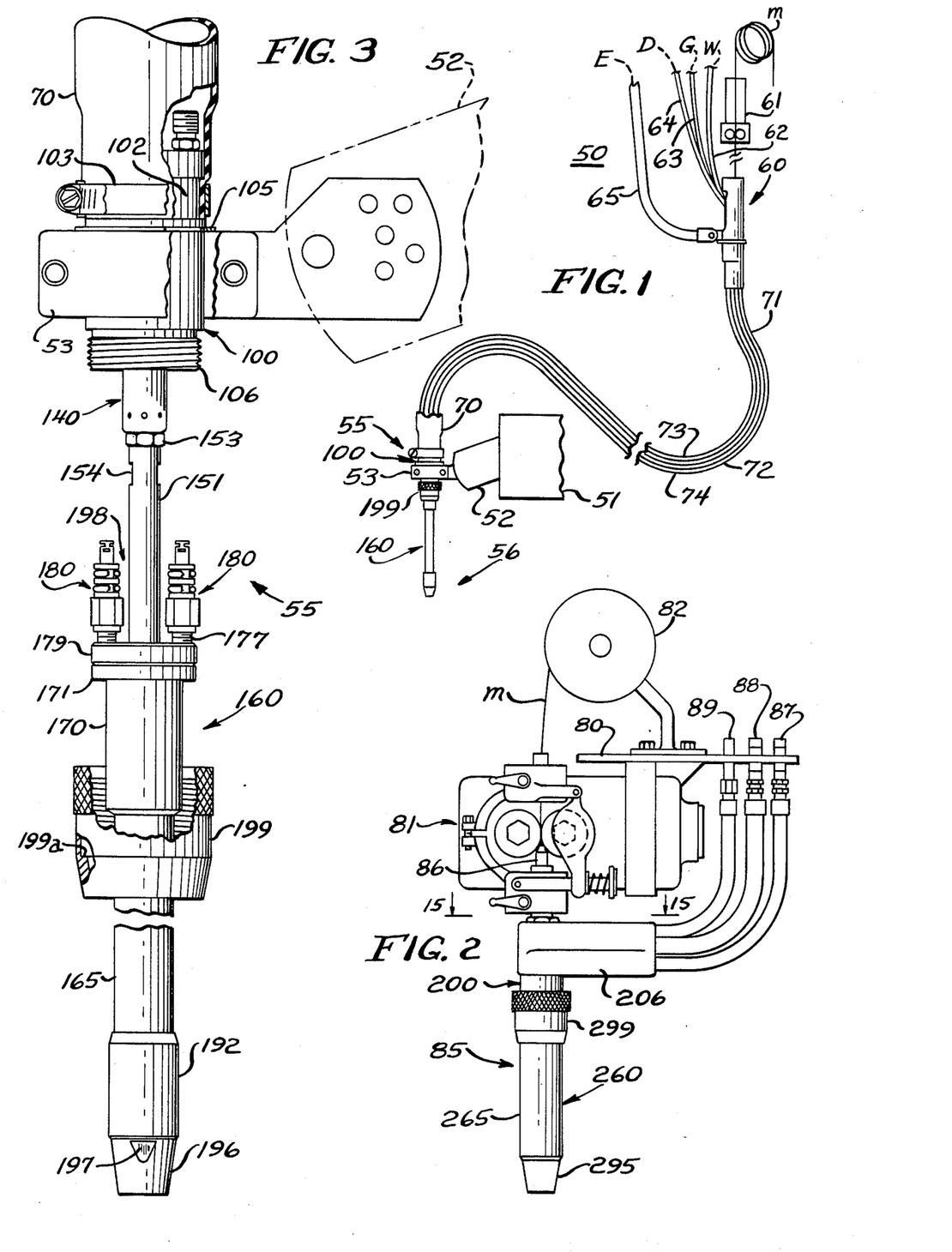
FIG. 1 is a fragmentary side elevational view of a welding system including a welding unit incorporating a docking assembly constructed in accordance with and embodying the features of a first embodiment of the present invention.
FIG. 2 is a side elevational view of a welding system incorporating a docking assembly in accordance with a second embodiment of the present invention.
FIG. 3 is an enlarged, fragmentary, partially exploded side elevational view of the docking assembly and associated welding unit of FIG. 1.
Figure 4:
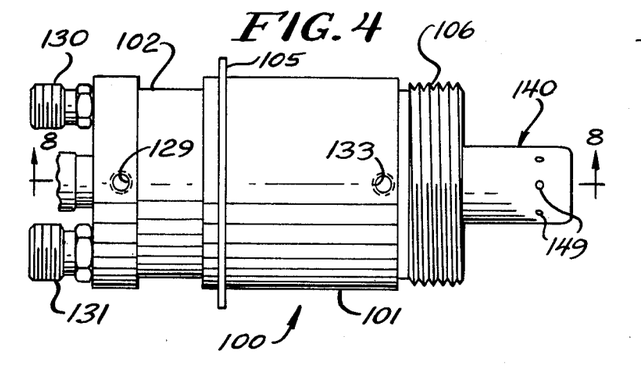
FIG. 4 is a further enlarged, fragmentary, side elevational view of the docking body of the docking assembly of FIG. 3, rotated 90° counterclockwise.
Figure 5:
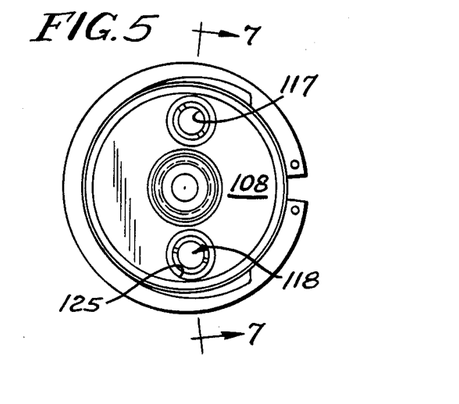
FIG. 5 is an end elevational view of the docking body of FIG. 4, as viewed from the right-hand end thereof.
Figure 6:
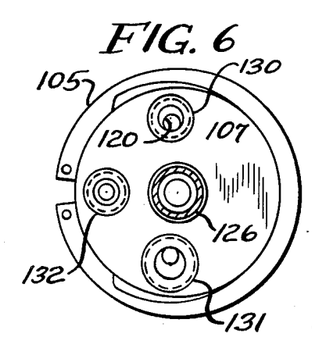
FIG. 6 is an end elevational view of the docking body of FIG. 4, as viewed from the left-hand end thereof.

Referring to FIG. 1 there is illustrated an arc welding system, generally designated by the numeral 50, of the type for use in robotic welding applications. More specifically, an associated robot machine (not shown) of known construction has a robot arm 51 provided with an articulated wrist 52 at the distal end thereof, which carries a gun mounting bracket 53. Mounted in the gun mounting bracket 53 is an arc welding unit 55 for performing welding operations at a welding station 56. Typically, the robot arm 51 and wrist 52 will move, under computer program control, as necessary to cause the welding unit 55 to follow a predetermined weld path along an associated workpiece (not shown). The welding unit 55 includes a docking body 100 to which is releasably coupled a water-cooled nozzle assembly 160, all in accordance with a first embodiment of the present invention, as will be explained in greater detail below.

The utilities may be supplied to the welding unit 55 by a movable utilities station 60, which may be of the type disclosed in my U.S. Pat. No. 4,210,796, the disclosure of which is incorporated herein by reference. Typically, the utilities station 60 is supported overhead on a boom or other structure carrying a manifold system which may supply a plurality of such utilities stations 60, one for each of a number of robot machines. Associated with the utilities station 60 is a wire feeder 61 which feeds a consumable wire electrode M from an associated supply into a wire guide in the utilities station 60. Also supplied to the utilities station 60 are cooling water W via a conduit 62 and arc shielding gas G via a conduit 63, the recirculated cooling water being returned to a suitable drain D via a conduit 64. Electric welding potential E is applied to the utilities station 60 through a power cable 65. The utilities are then delivered from the utilities station 60 to the welding unit 55 via a number of conduits encased in a delivery conduit sheath 70. Specifically, the sheath 70 encloses a wire electrode casing 71, a water inlet hose 72, a water drain hose 73 in which is embedded a power cable, and a gas inlet hose 74. The sheath 70 and the associated conduits all have a length sufficient to accommodate the programmed movement of the welding unit 55.

Referring to FIG. 2, there is illustrated an alternative version of the present invention, designed for use with fixed or dedicated mechanized welding applications. More specifically, in this version a fixed mounting plate 80 on a robot or other welding machine carries a wire feeder 81 of known construction which supplies the metal wire electrode M from an associated supply reel 82 which is also fixedly mounted on the plate 80. Also carried by the plate 80 is a welding unit 85 which includes a wire guide 86 for receiving and guiding the wire electrode M from the wire feeder 81 to an associated docking body 200, on which is mounted a nozzle assembly 260. Communication between the docking body 200 and the associated utilities supply and the water drain is provided by a water inlet hose 87, a water outlet hose 88 in which is embedded a power cable, and a gas inlet hose 89, these three hoses all being enclosed adjacent to the docking body 200 by a sheath 206 which also covers the upper end of the docking body 200. It will be appreciated that the welding unit 85 is utilized in applications which do not require it to move to follow a welding path, such as repeated spot welds, or where the workpiece is moved relative to the welding unit 85.

The construction and operation of the welding unit 55 of FIG. 1 will now be described in greater detail. Referring to FIGS. 3-8 of the drawings, the docking body 100 includes a solid cylindrical metal body 101, which may be formed of brass. The body 101 has an annular channel or recess 102 formed in the outer surface thereof adjacent to the input end thereof for receiving a clamp 103 (see FIG. 3) securely to clamp the adjacent end of the delivery conduit sheath 70. Also formed in the outer surface of the body 101 is a circumferential groove 104 (FIG. 7) in which is received a resilient split positioning ring 105, for a purpose to be explained more fully below. The outlet end of the body 101 is externally threaded, as at 106. The body 101 has circular input and output end faces 107 and 108 between which are formed an axial bore or passage 110.

Figure 7:
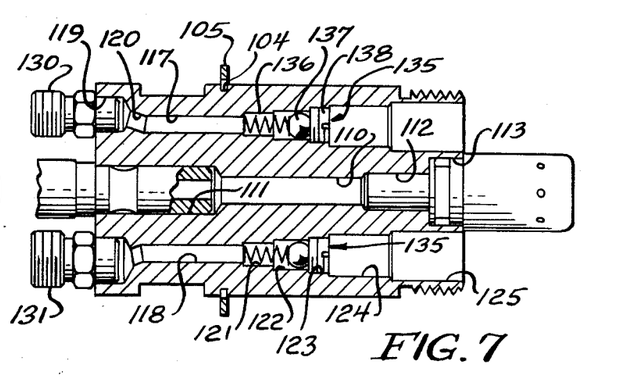
FIG. 7 is a view in vertical section taken along the line 7—7 in FIG. 5.
Figure 8:
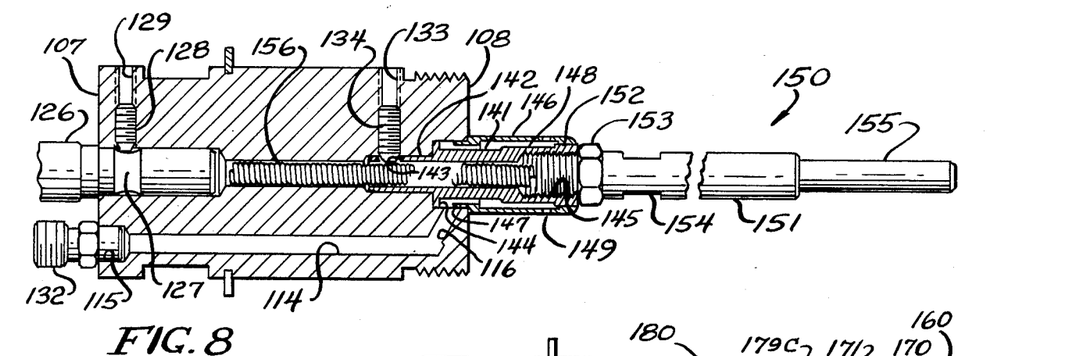
FIG. 8 is a view in horizontal section, taken along the line 8—8 in FIG. 4, and including the tip assembly of the associated welding unit.

Referring in particular to FIG. 7, the passage 110 has an enlarged counterbore input end portion 111, and two successively larger counterbore portions 112 and 113 at the output end. Also extending through the body 101 from the input face 107 to the output face 108 is a gas passage 114 (FIG. 8) which has an enlarged counterbore portion 115 at the input end thereof opening to the input face 107, and is provided adjacent to the other end thereof with an inclined spur portion 116 which communicates with the counterbore portion 113 of the axial passage 110 a slight distance inwardly of the output face 108.

Also extending through the body 101 from the input face 107 to the output face 108 are a water input passage 117 and a water drain passage 118 (see FIG. 7), which are similar in construction and are both substantially parallel to the axial passage 110. Each of the passages 117 and 118 has an enlarged-diameter counterbore portion 119 at its input end which communicates via a slightly angled portion 120 with the main passage. Each of the passages 117 and 118 is also provided adjacent to the output end thereof with a plurality of successively larger diameter counterbore portions 121, 122, 123, 124 and 125.

A wire guide fitting 126 is received in the counterbore portion 111 of the axial passage 110 for guiding the metal wire electrode M from the electrode casing 71 into the passage 110. The fitting 126 is provided with a circumferential groove 127 which receives a set screw 128 threadedly engaged in a radial bore 129 in the body 101 for fixedly securing the fitting 126 in place (see FIG. 8). Respectively brazed in place in the counterbore portions 115 and 119 of the passages 114, 117, and 118 are a water input fitting 130, a water output fitting 131 and a gas fitting 132. Each of these fittings is provided with an externally threaded portion adapted to be threadedly coupled to a mating fitting at the end of the associated one of the conduits 71–74 for transferring water and gas to the body 101 and receiving water from the body 101. In this regard, it will be appreciated that the water drain fitting at the end of the drain hose 73 is designed to also terminate the electric power cable which is carried within the drain hose 73. Accordingly, the electrical welding potential is coupled via the fitting 131 to the conductive metal body 101 in a known manner. Also provided in the body 101 adjacent to the threaded portion 106 is a radial bore 133 in which is threadedly received a set screw 134 for a purpose to be explained below.

Each of the water passages 117 and 118 is provided with a check valve 135 (FIG. 7) which includes a helical compression spring 136 seated in the counterbore portion 121 for resiliently urging a valve ball 137, disposed in the counterbore portion 122, against an annular seat 138 which is threadedly engaged in the counterbore portion 123, for closing the passage therethrough.

Fixedly secured to the body 101 at the output end thereof is an output fixture 140, which is of known construction and cooperates with the body 101 to form the inner body of the welding unit 55, analogous to the inner body construction disclosed in my U.S. Pat. No. 3,775,584. The output fixture 140 includes a cylindrical inner tube 141 (FIG. 8) having a reduced-diameter tip 142 which is received in the counterbore portion 112 of the axial passage 110 and is provided with a radial aperture 143 therein disposed for alignment with the bore 133 in the body 101. The inner tube 141 also has a radially outwardly extending annular flange 144 dimensioned to seat at the bottom of the counterbore portion 113 of the passage 110 and is there brazed in place. The outer end of the inner tube 141 projects well beyond the output face 108 of the body 101 and is internally threaded, as at 145.

Telescopically received over the outer end of the inner tube 141 is a cylindrical sleeve 146 (FIG. 8) having a diameter slightly greater than the diameter of the counterbore portion 113 of the passage 110. The sleeve 146 has a reduced-diameter end 147 adapted to be slidingly received into the counterbore portion 113 and brazed to the body 101. The sleeve 146 is dimensioned to be spaced radially from the inner tube 141, except at the outer ends thereof where they are brazed together, the sleeve 146 and the tube 141 cooperating to define therebetween an annular chamber 148 which communicates at its inner end with the spur portion 116 of the gas passage 114. Formed in the sleeve 146 adjacent to the outer end of the chamber 148 are a plurality of circumferentially spaced-apart gas exit holes 149.

Removably mounted on the output fixture 140 is a welding tip assembly, generally designated by the numeral 150, which is substantially of conventional construction. The tip assembly 150 includes a tubular adapter 151 provided with an externally threaded lug 152 at one end thereof adapted to be threadedly engaged with the internally threaded portion 145 of the output fixture 140 and locked in place by a jam nut 153. Flats 154 may be formed on the outer surface of the adapter 151 to receive an associated tool to facilitate mounting and demounting of the adapter 151. Threadedly received in the adapter 151 at its distal end is a contact tip 155.

It will be appreciated that the tip assembly 150 guides the welding wire electrode M to the associated workpiece, the contact tip 155 preferably having an inner diameter only very slightly greater than the diameter of the welding wire electrode M. In this regard, there is typically provided a flexible wire support liner 156 which extends through the axial passage 110 in the body 101 from the fitting 126 and through the output fixture 140 and the adapter 151 to provide accurate guiding of the metal electrode wire M therethrough. The wire support liner 156 is held in place by the set screw 134 so that it cannot fall out in the event that the adapter 151 and/or the contact tip 155 are removed. While a threaded contact tip 155 has been illustrated, it will be appreciated that other known types of contact tips, such as that disclosed in FIG. 18, could be utilized.

Referring now in particular to FIGS. 3 and 9-14, the nozzle assembly 160 will be described in detail. The nozzle assembly 160 illustrated is of a long-reach, slimline, water-cooled style, but it will be appreciated that different types of welding nozzle assemblies are utilized for different applications, and the nozzle assembly 160 could be of any of these general types. It will likewise be appreciated that the tip assembly 150 will have a length corresponding to the length of the associated nozzle assembly 160. Also, while the nozzle assembly 160 is of the water-cooled type, it will be appreciated that the principles of the present invention are applicable to air-cooled nozzle assemblies.

Figures 10, 11, 12:
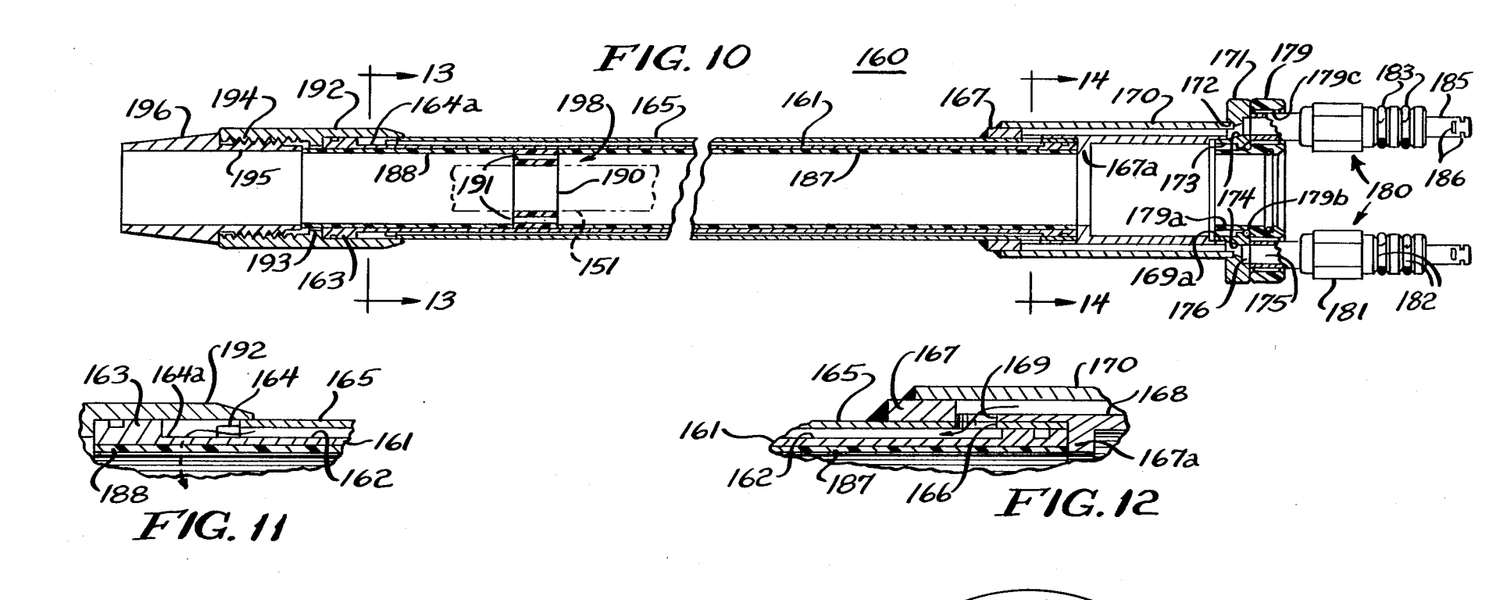
FIG. 10 is a further enlarged, fragmentary view in vertical section of the nozzle assembly of the welding unit of FIG. 3, rotated 90° clockwise.
FIG. 11 is a still further enlarged, fragmentary sectional view of a portion of the nozzle assembly of FIG. 10 adjacent to the distal end thereof.
FIG. 12 is a further enlarged, fragmentary sectional view of a portion of the nozzle assembly of FIG. 10 adjacent to the coupled end thereof.
Figure 13:
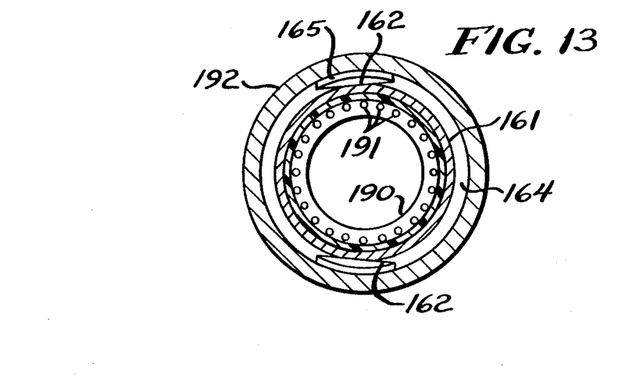
FIG. 13 is a enlarged view in vertical section taken along the line 13—13 in FIG. 10.
Figure 14:
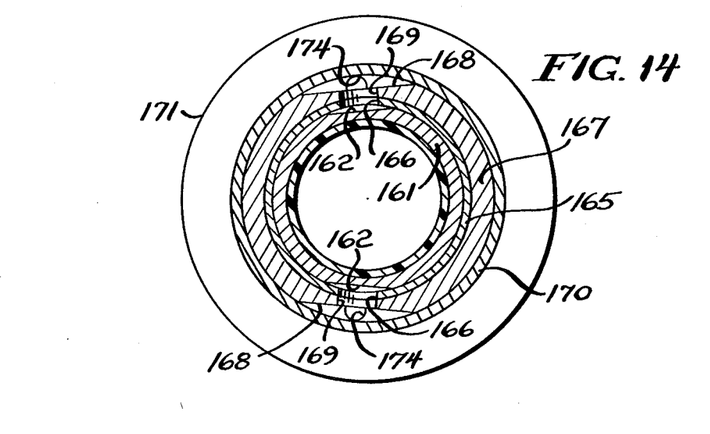
FIG. 14 is a further enlarged view in vertical section taken along the line 14—14 in FIG. 10.

The nozzle assembly 160 includes an elongated cylindrical inner tube 161 provided on the outer surface thereof with two elongated flat planar portions 162. The distal or output end of the inner tube 161 has an enlarged-diameter portion 163. Also formed on the inner tube 161 and spaced longitudinally a slight distance from the enlarged-diameter portion 163 is a radially outwardly extending circumferential rib or flange 164 which cooperates with the enlarged-diameter portion 163 to define therebetween an annular channel 164a (FIG. 11). The flat portions 162 extend through the circumferential flange 164 into the channel 164a, as can best be seen in FIGS. 11 and 13.

The inner tube 161 is disposed telescopically within an outer tube 165, the distal end of which abuts the circumferential flange 164, with the input ends of the inner and outer tubes 165 being substantially flush with each other. The inner and outer tubes 161 and 165 contact each other around the entire circumference thereof, except at the flat portions 162. The inner and outer tubes 161 and 165 are brazed together at the input ends thereof and at the circumferential flange 164, the outer tube 165 being provided with two circular openings 166 therethrough disposed for alignment, respectively, with the flat portions 162, as can best be seen in FIGS. 12 and 14. In this regard, the flat portions 162 are preferably not diametrically opposed on the inner tube 161. This facilitates assembly of the parts, insuring that they can properly be mated in only one orientation.

The input end of the outer tube 165 is telescopically received within a transfer collar 167 and is brazed thereto, the transfer collar 167 having a radially inwardly extending circumferential flange 167a which limits the depth of insertion of the outer tube 165 therein. The transfer collar 167 has two longitudinally-extending flat portions 168 on the outer surface thereof, respectively disposed for longitudinal alignment with the flat portions 162 on the inner tube 161. Formed through the transfer collar 167, respectively at the outer ends of the two flat portions 168, are two holes 169, respectively disposed in registry with the holes 166 in the outer tube 165 (see FIGS. 12 and 14). The input end of the transfer collar 167 has a counterbore portion 169a on the inner diameter thereof (see FIG. 10).

A cylindrical sleeve 170 telescopically surrounds the transfer collar 167 and is brazed thereto at the output end thereof, the sleeve 170 contacting the transfer collar 167 along substantially the entire outer surface thereof except for the flat portions 168. Fixedly secured to the sleeve 170 at its input end is an annular mounting collar 171 having a circular groove 172 in one face thereof in which the adjacent end edge of the sleeve 170 is seated and brazed in place. The mounting collar 171 is provided at its inner surface with a cylindrical flange 173 which is dimensioned to fit within the counterbore portion 169a of the transfer collar 167, being brazed thereto. Two ports 174 are formed through the mounting collar 171 in position for alignment, respectively, with the flat portions 168 on the transfer collar 167 (see FIGS. 10 and 14). Secured to the mounting collar 171 are two tubular metal connectors 175, each having a reduced-diameter tip 176 which is received in an enlarged counterbore portion of a corresponding one of the ports 174 and brazed thereto. Each of the connectors 175 is provided with an externally threaded portion 177 (FIG. 3) at its outer end.

The connectors 175 are received through bores 179c in an annular insulator collar 179 (FIG. 10), which is formed of an electrically insulating material such as polytetrafluoroethylene. The insulating collar 179 has a cylindrical portion 179a on its inner surface which projects inwardly through the central bore in the annular mounting collar 171, the cylindrical portion 179a preferably being provided with a surrounding O-ring seal 179b which is seated in an annular recessed portion of the mounting collar 171.

Respectively threadedly engaged with the connectors 175 are two identically-constructed tubular water transfer fittings 180 (FIGS. 3, 9 and 10), each of which is provided with a hexagonal portion 181 to facilitate mounting and demounting, and two circumferential grooves 182 in which are respectively received O-ring seals 183. Each of the fittings 180 is provided with a tubular actuator tip 185 having slots 186 in the side surface thereof adjacent to the distal end thereof, for a purpose to be explained more fully below.

Telescopically received within the inner tube 161 are a short cylindrical insulating sleeve 188 and an long cylindrical insulating sleeve 187, spaced apart by a gas diffuser ring 190, all being formed of suitable electrically insulating materials. The gas diffuser ring 190 has a plurality of circumferentially spaced-apart bores 191 therethrough (see FIGS. 10 and 13). The inner diameter of the gas diffuser ring 190 is dimensioned to just slidably fit over the adapter 151 of the tip assembly 150, as indicated in FIG. 10.

Telescopically received over the distal end of the inner tube 161 is a cylindrical adapter sleeve 192, provided with a radially inwardly extending circumferential flange or shoulder 193 which limits the depth of insertion of the inner tube 161 therein at a position wherein the adapter sleeve 192 just overlaps the distal end of the outer tube 165. The adapter sleeve 192 is brazed to both the inner and outer tubes 161 and 165 and cooperates therewith to close the annular channel 164a.

The outer end of the adapter sleeve 192 extends well beyond the adjacent end of the inner tube 161 and is internally threaded, as at 194, for threadedly receiving therein a cylindrical gas nozzle 195. The tip the gas nozzle 195 is provided with a substantially frustoconical outer surface 196 and two diametrically opposed flattened portions 197 to facilitate application of an associated tool to aid in mounting and demounting of the gas nozzle 195. The inner end of the gas nozzle 195 abuts the adjacent end of the insulating sleeve 188, while the circumferential flange 167a on the transfer collar 167 abuts the adjacent end of the insulating sleeve 187, securely to hold the insulating sleeves 187 and 188 and the gas diffuser ring 190 in place. The gas nozzle 195 has an inner diameter substantially greater than the outer diameter of the tip assembly 150 which extends coaxially thereinto.

It will be appreciated that the adapter 151 cooperates with the insulating sleeves 187 and 188 and the gas nozzle 195 to define therebetween an annular gas passage 198, best illustrated in FIG. 10, this passage including the bores 191 through the gas diffuser ring 190. Referring to FIG. 3, the nozzle assembly 160 is also provided with a cone nut 199 (FIG. 3), formed of a suitable electrically insulating material, and having an internal shoulder 199a for mounting the nozzle assembly 160 in place on the docking body 100, as will be explained below.

The assembly and operation of the welding unit 55 will now be explained. Initially, the docking body 100 is coupled to the utilities delivery hose conduits 71–74 by the fittings 126, 130, 131 and 132, and the sheath 70 is clamped around the body 101 with the clamp 103. Then, the threaded end 106 of the body 101 is dropped into the gun mounting bracket 53, the positioning ring 105 engaging the top of the mounting bracket 53 to limit the depth of insertion of the body 101 therein. This accurately positions the docking body 100 with respect to the robot wrist 52 and, therefore, with respect to the associated workpiece. The mounting bracket 53 is secured tightly about the docking body 100. The tip assembly 150 may be mounted to the output fixture 140 either before or after mounting of the docking body 100 on the mounting bracket 53.

Figure 9:
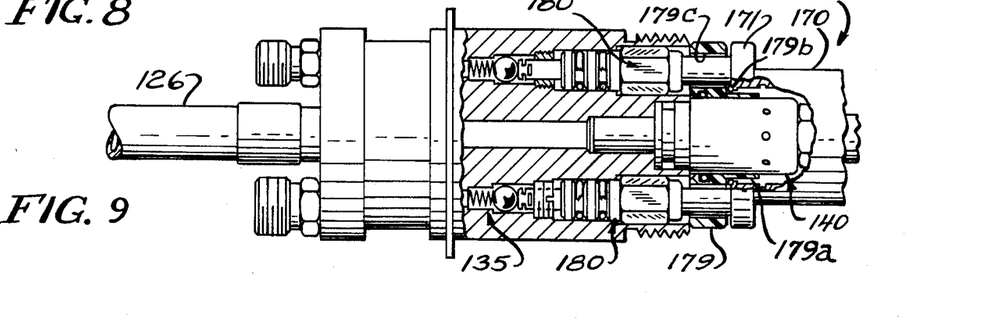
FIG. 9 is a view similar to FIG. 4, in partial vertical section, illustrating the nozzle assembly docked with the docking body.

The welding unit 55 is now ready for mounting of the nozzle assembly 160. In this regard, it is a fundamental feature of the present invention that the nozzle assembly 160 can be quickly and easily manually mounted and demounted with respect to the docking body 100, without the use of tools. More specifically, referring in particular to FIG. 3, the nozzle assembly 160 is slipped up over the tip assembly 150, the tip assembly 150 being slidably received through the gas diffuser ring 190, as indicated in FIG. 10. The water transfer fittings 180 are respectively received in the receptacle formed by the multiple-counterbored portions of the water passages 117 and 118 until the insulator collar 179 abuts the output face 108 of the docking spool body 101, as is best illustrated in FIG. 9.

In this mounted condition the water transfer fittings 180 cooperate with the passages 117 and 118 to form plug-and-socket type couplings, the counterbore portions 125 accommodating the hexagonal portions 181 of the water transfer fittings, and the counterbore portions 124 frictionally receiving the O-rings 183 therein in sealing relationship therewith. The actuator tips 185 are respectively received through the annular seats 138 of the check valves 135 for depressing the balls 137 against the urging of the compression springs 136 to open the check valves and permit the free flow of water through the passages 117 and 118, as illustrated in FIG. 9. The cone nut 199 is then slipped up over the distal end of the nozzle assembly 160 and is threadedly engaged with the threaded portion 106 of the body 101, the shoulder 199a engaging the mounting collar 171 securely to lock the nozzle assembly 160 in its mounted condition, illustrated in FIG. 1.

When the welding unit 55 is thus assembled, the arc shielding gas flows through the gas passage 114 in the body 101 into the annular chamber 148 in the output fixture 140, through the gas exit holes 149 therein into the nozzle assembly 160 and, particularly, into the passage 198, and through the gas diffuser ring 190 to the gas nozzle 195, where it surrounds the contact tip 155 to shield the welding arc in a known manner.

The cooling water flows through the water input passage 117 and the open check valve 135 therein and through the slots 186 in the actuator tip 185 of the corresponding water transfer fitting 180. The water then flows through the water transfer fitting 180, the associated connector 175 and the associated port 174 of the mounting collar 171 to a channel formed between the sleeve 170 and the transfer collar 167 by the corresponding one of the flat portions 168. The water then flows through the aligned holes 166 and 169 to the channel between the inner and outer tubes 161 and 165 of the nozzle assembly 160, formed by the corresponding one of the flat portions 162. Water then flows down along the nozzle assembly 160 to the annular channel 164a, where it circulates around the distal end of the nozzle assembly 160 and then back up along the channel formed by the other one of the flat portions 162. The water returns in like manner through the other water transfer fitting 180 and through the drain passage 118 in the body 101 via the open check valve 135 therein to the water drain hose 73.

It will be appreciated that the electrical welding current is applied to the metal wire electrode through the body 101, the output fixture 140 and the tip assembly 150 which are all in electrical contact with one another, in a known manner. Also, it can be seen that the insulator collar 179, the insulating sleeves 187 and 188, the gas diffuser ring 190 and the cone nut 199 insure complete electrical insulation of the nozzle assembly 160 from the welding potential.

When it is desired to remove the nozzle assembly 160, such as when the gas nozzle 195 becomes clogged with welding spatter, or is damaged or for any other reason, one need only unscrew the cone nut 199 and simply pull the nozzle assembly 160 from the docking body 100. The bias springs 136 will automatically close the check valves 135 to prevent any water spillage from the docking body 100, thus obviating disconnection of the cooling water at the water supply. A new nozzle assembly 160 can be simply and easily installed in place in the manner described above, without any necessity for using tools or for in any way disturbing the docking body 100 or any other part of the welding unit 55 or the arc welding system 50, including the utilities supplies.

If it were necessary to change the tip assembly 150 for any reason, this could very easily be done also. While it would require the use of a wrench or the like, it would not necessitate disturbing the docking body 100 or any other part of the arc welding system 50, including the utilities supplies. It will also be appreciated that if the docking body 100 needs to be removed, for, servicing or any other reason, it can be reinstalled without loss of the critical positioning with respect to the associated robot, since the positioning ring 105 will insure that it is repositioned at exactly the same distance from the workpiece. Thus no recalibration of the welding system 50 will be necessary and the welding program can be resumed where it was interrupted.

The welding unit 85 illustrated in FIG. 2 will now be described. Referring in particular to FIGS. 15-19, the docking body 200 includes a solid cylindrical metal body 201, which may be formed of brass. The body 201 has an enlarged-diameter portion 202 which has an externally threaded end 203. Formed in the outer surface of the enlarged-diameter portion 202 is a circumferential groove 204 which is adapted to receive therein an annular lip (not shown) of the sheath 206 for attaching the sheath 206 to the body 201.

Figure 18:
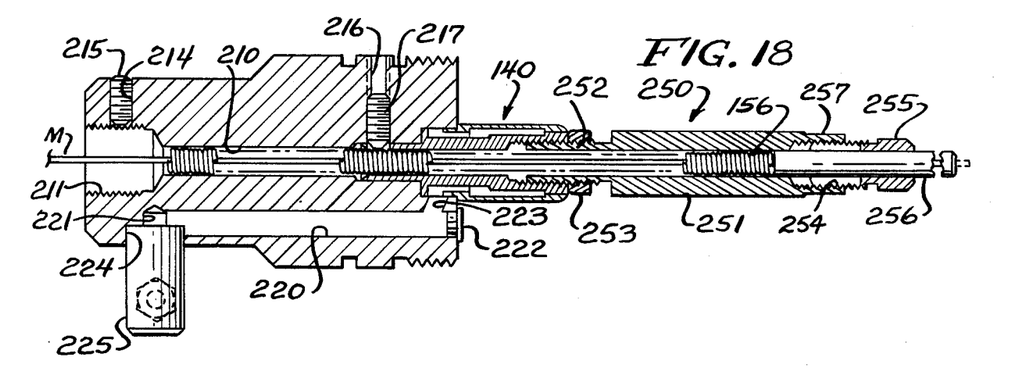
FIG. 18 is a view in vertical section taken along the line 18—18 in FIG. 16, rotated 90° counterclockwise and including the tip assembly of the associated welding unit.
Figure 19:
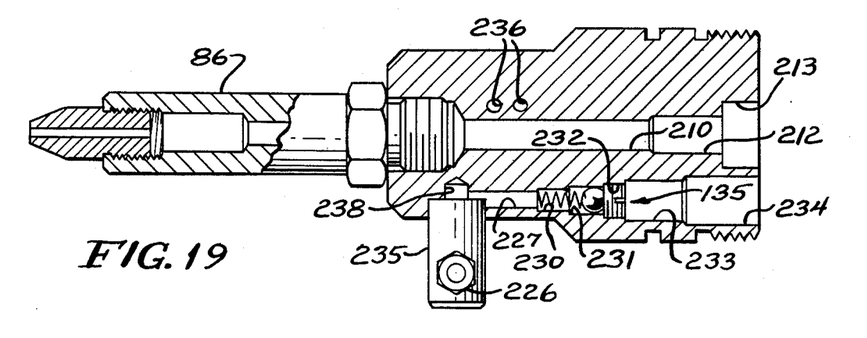
FIG. 19 is a view in vertical section taken along the 19—19 in FIG. 16, rotated 90° counterclockwise and including the wire guide of the associated welding unit.

The body 201 has a circular input end face 207 and a circular output end face 208, between which extends an axial cylindrical passage 210 through the body 201. The passage 210 has an enlarged-diameter, internally-threaded counterbore portion 211 at its input end, and is provided at its output end with successively larger-diameter counterbore portions 212 and 213. The wire guide 86 is threadedly engaged in the counterbore portion 211 of the passage 210, being locked in place by a set screw 215 which is threadedly engaged in a radial bore 214 in the body 201 (FIGS. 18 and 19). Also formed in the body 201 is a radial bore 216 which communicates with the counterbore portion 212 and in which is threadedly engaged a set screw 217, for a purpose to be explained below.

Figures 15, 16, 17:
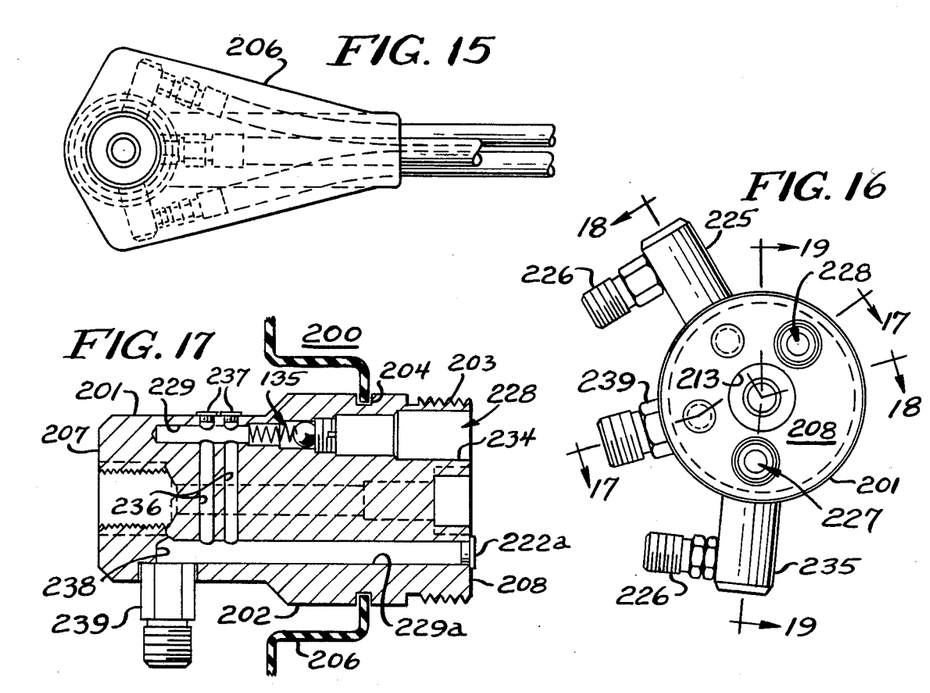
FIG. 15 is an enlarged top plan view of the docking assembly of FIG. 2, taken generally along the line 15—15 in FIG. 2.
FIG. 16 is a further enlarged bottom plan view of the docking spool of FIG. 15, rotated 180°.
FIG. 17 is a view in vertical section, taken along the line 17—17 in FIG. 16, and rotated 90° counterclockwise.

Formed in the body 201 is a gas passage 220, the main portion of which is formed by providing a longitudinal bore in the output face 208. The passage 220 is provided with a radially extending input portion 221 spaced a predetermined distance from the input face 207 of the body 201. The gas passage 220 is sealed at the output face 208 by a cap 222, and is provided with an angled spur portion 223 which communicates with the counterbore portion 213 of the axial passage 210. The radial input portion 221 is provided with a large-diameter counterbore portion 224 in which is received a gas input fitting 225 which is brazed in place. The fitting 225 is provided with an externally threaded connector 226 extending therefrom perpendicular thereto, as is best illustrated in FIG. 16.

Also formed in the body 201 are a water input passage 227 (FIG. 19) and a water drain passage 228, which includes bores 229 and 229a (FIG. 17) extending from the output face 208 of the body 201 substantially parallel to the axial passage 210, and terminating short of the input face 207. The water input passage 227 and the bore 229 of the water drain passage 228 are each provided with successively larger-diameter counterbore portions 230, 231, 232, 233, and 234 (see FIG. 19), each of these passages being provided with a check valve 135 identical to that described above in connection with the welding unit 55. Communication between the bores 229 and 229a of the water drain passage 228 is provided by two parallel transfer bores 236 (FIGS. 17 and 19), which extend generally along a chord of the body 201, these bores being closed at their outer ends by caps 237 and the bore 229a being closed at its outer end by a cap 222a. Each of the passages 227 and 228 has a radial portion 238 spaced a predetermined distance from the input face 207 of the body 201. The radial portions 238 each have enlarged-diameter counterbore portions in which are respectively seated fittings 235 and 239 which are brazed in place. The fitting 235 is provided with a connector 226 projecting perpendicularly therefrom in the same manner as described above with respect to the fitting 225. The connectors 226 and the fitting 239 are all arranged so that their axes converge to one side of the body 201 to facilitate consolidation of the associated utilities conduits in a common sheath 206. In this regard, it will be appreciated that the sheath 206 is adapted to enclose the fittings 225, 235 and 239.

The docking body is provided with an output fixture 140 substantially identical to that described above in connection the welding unit 55, which is received in the counterbore portions 212 and 213 of the axial passage 210, and is there brazed in place. Mounted on the output fixture 140 is a tip assembly 250 which includes an elongated tubular adapter 251 having a hexagonal outer surface with a reduced cylindrical portion 257 at its output end, and an externally threaded lug 252 at its input end which is threadedly engaged with the output fixture 140 and locked in place with a jam nut 253. The other end of the adapter 251 is internally threaded, as at 254, for threadedly receiving therein a collet nut 255 in which a contact tip 256 is slidably telescopically received. When the collet nut 255 is tightened, it clamps the contact tip 256 in place in a known manner. Preferably, there is also provided a wire support liner 156 identical to that described above in connection with FIG. 8, which extends from the wire guide 86 through the axial passage 210 and the adapter 251 to the collet nut 255 for accurately guiding the wire electrode M to the contact tip 256, the wire support liner 156 being locked in place by the set screw 217.

While the tip assembly 250 has been illustrated as being of the type utilizing a slip-in contact tip 256, it will be appreciated that other types of known tip assemblies could be used, such as that illustrated in FIG. 25, which will be described more fully below.

Figure 20:
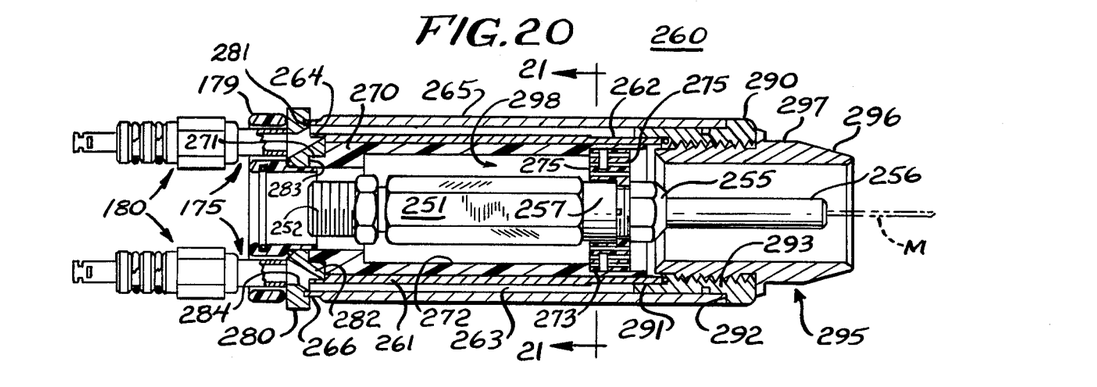
FIG. 20 is enlarged view in vertical section, rotated 90° counterclockwise, of the nozzle assembly of the welding unit of FIG. 2.
Figure 21:
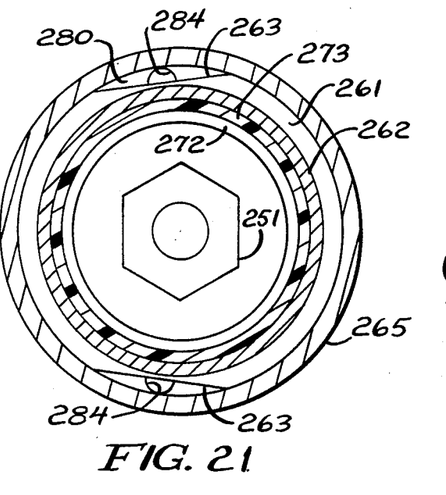
FIG. 21 is a further enlarged view in vertical section taken along the line 21—21 in FIG. 20.

Referring now also to FIGS. 20-24, the nozzle assembly 260 will be described. The nozzle assembly 260 includes an elongated, cylindrical inner tube 261 having a reduced-diameter portion 262 at is outer end. The outer surface of the inner tube 261 is provided with two spaced-apart longitudinally extending flat portions 263 which extend the length thereof, and are preferably not diametrically opposed. The inner end of the inner tube 261 has a counterbore portion 264 on its inner diameter (FIG. 20). The inner tube 261 is telescopically received within a cylindrical outer tube 265 which is slightly longer than the inner tube 261 and is provided with a reduced-diameter portion 266 and its input end.

Figure 22:
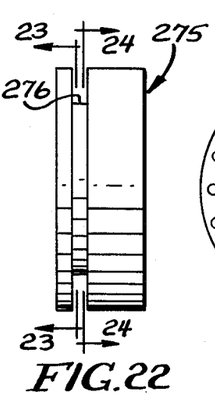
FIG. 22 is an enlarged side elevational view of the gas diffusing ring of the nozzle assembly of FIG. 20.
Figure 23:
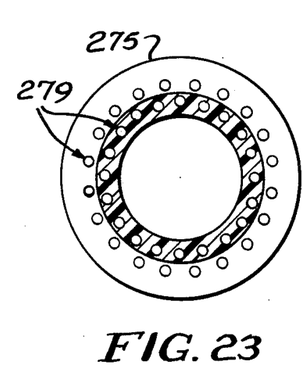
FIG. 23 is a view in vertical section taken along the line 23—23 in FIG. 22.
Figure 24:
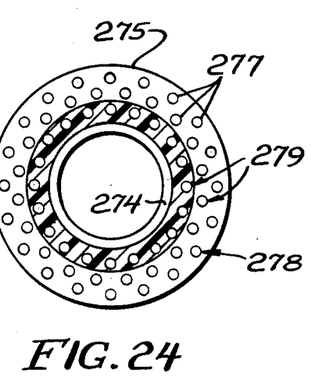
FIG. 24 is a view in vertical section taken along the line 24—24 in FIG. 22.

Telescopically received within the inner tube 261 is a cylindrical insulator 270, formed of a suitable electrically insulating material. The insulator 270 has a reduced-diameter portion 271 at its input end with an elongated counterbore portion 272 and a shorter, larger-diameter counterbore portion 273 at its output end. Seated within the counterbore portion 273 is an annular gas diffuser ring 275, which has a circumferential groove 276 in the outer surface thereof adjacent to the input end thereof. As is best illustrated in FIGS. 22-24, the gas diffuser ring 275 is provided with three radially-spaced apart rows of circumferentially spaced apart holes 277 therein extending parallel to the axis thereof. The outer row 278 extends only from the groove 276 to the output face of the gas diffuser ring 275. The two inner rows 279 extend all the way through the gas diffuser ring 275 from the input face to the output face thereof, the outer one of these two inner rows communicating with the groove 276. The inner surface of the ring 275 is counterbored at its input end to form an annular shoulder 274 (FIG. 24) against which the cylindrical portion 257 of the adapter 251 abuts (see FIG. 20).

The nozzle assembly 260 is also provided with an annular mounting collar 280 having a circular groove 281 in one face thereof in which is seated the reduced-diameter portion 266 of the outer tube 265 for brazing thereto. The mounting collar 280 is provided with a cylindrical flange 282 projecting therefrom and received within the counterbore portion 264 of the inner tube 261 for brazing thereto. The flange 282 serves to define an annular shoulder 283 against which the reduced-diameter portion 271 of the insulator 270 is seated, the larger-diameter portion of the insulator 270 being seated against the end face of the cylindrical flange 282. Formed through the mounting collar 280 are two ports 284 positioned respectively to be aligned with the flat portions 263 of the inner tube 261. Seated in the ports 284 and brazed to the mounting collar 280 are two connectors 175 identical to those described above in connection with the nozzle assembly 160. The nozzle assembly 260 is also provided with an insulator collar 179 like that described in connection with the nozzle assembly 160, the cylindrical portion 179a of the insulator collar 179 extending within the insulator 270. Water transfer fittings 180 identical to those described above in connection with the nozzle assembly 160 are respectively threadedly engaged with the connectors 175.

The nozzle assembly 260 is also provided with a cylindrical adapter sleeve 290, having a counterbore portion 291 at the input end thereof dimensioned to be received telescopically over the reduced-diameter portion 262 of the inner tube 261 and brazed thereto. The outer end of the adapter sleeve 290 has an enlarged-diameter portion which forms a shoulder 292 against which the outer end of the outer tube 265 is seated, the adapter sleeve 290 being brazed to the outer tube 265. The outer end of the adapter sleeve 290 is internally threaded, as at 293. Threadedly received within the adapter sleeve 290 is a cylindrical gas nozzle 295, the outer end of which has a frustoconical outer surface 296 provided with diametrically spaced-apart flat portions 297 to facilitate application of an associated tool.

Referring to FIG. 20, it will be appreciated that when the gas nozzle assembly 260 is mounted in place on the welding unit 85, the tip assembly 250 is received coaxially therethrough. In this regard, the shoulder 274 of the gas diffuser ring 275 is seated against the end of the cylindrical portion 257 of the adapter 251 being secured in place by the collet nut 255. The tip assembly 250 cooperates with the insulator 270 and the gas nozzle 295 to form an annular passage 298 therebetween for the arc shielding gas, the passage 298 extending through the gas diffuser ring 275. More specifically, it will be appreciated that the gas flows through successively larger-diameter channels to the gas nozzle 295, exiting the output fixture 140 to flow into the portion of the passage 298 along the inner end of the insulator 270, then into the larger-diameter counterbore portion 272 of the insulator 270. The gas then flows directly through the inner two rows 279 of holes 277 in the gas diffuser ring 275 to the gas nozzle 295. The gas in the outer one of these inner two rows of holes 279 also flows radially outwardly through the groove 276 to the outer row 278 of holes 277. This arrangement has been found to provide an improved control of the gas flow to the welding arc.

Figure 25:
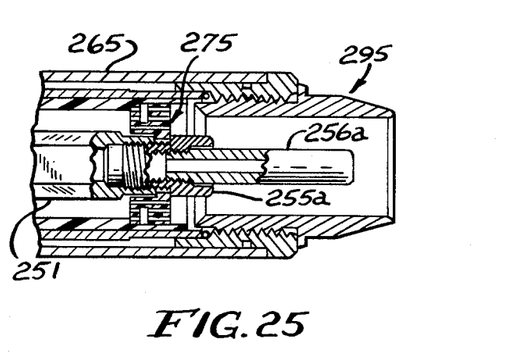
FIG. 25 is a fragmentary sectional view of a modified tip assembly of the present invention.

Referring to FIG. 25, there is illustrated an alternative form of contact tip 256a which could be used in place of the contact tip 256. The contact tip 256a is a threaded tip, similar to that illustrated in FIG. 8. However, the tip assembly 150 illustrated in FIG. 8 cannot be used with the nozzle assembly 260, since the gas diffuser ring 275 would fall out when the gas nozzle 295 is removed. Accordingly, in the embodiment of FIG. 25, there is provided a coupler nut 255a which is threadedly received in the end of the adapter 251, in the same manner as the collet nut 255. However, the coupler nut 255a is internally threaded to receive therein the threaded contact tip 256a. The hexagonal portion of the coupler nut 255a has external dimensions greater than the inner diameter of the gas diffuser ring 275 so as to retain the ring 275 in place.

A cone nut 299 (FIG. 2) of suitable electrically insulating material is telescopically received over the nozzle assembly 260 and threadedly engaged with the threaded portion 203 of the body 201 to lock the nozzle assembly 260 in place on the docking body 200, in substantially the same manner as was explained above in connection with the nozzle assembly 160.

The assembly and operation of the welding unit 85 is substantially similar to the of the welding unit 55. Initially, the fittings 225, 235 and 239 are coupled to the utilities supply hoses 87-89 and the sheath 206 is mounted in place. The wire guide 86 is mounted on the docking body 200 and then locked in place in the wire feeder 81 for supporting the welding unit 85. The tip assembly 250 may be mounted in place on the output fixture 140 either before or after mounting of the docking body 200 to the wire feeder 81.

The nozzle assembly 260 may then be manually fitter over the tip assembly 250 and plugged into the docking body 200 in substantially the same manner as was explained above with respect to the welding unit 55, and locked in place by the cone nut 299. The water transfer fittings 180 operate the check valves 135 in the same manner as was described above with respect to the embodiment of FIG. 1. The gas flows through the fitting 225 and the gas passage 220 to the output fixture 140. The water flows in through the fitting 235, the passage 227, the corresponding one of the water transfer fittings 180 and thence through the mounting collar 280 to the longitudinal channel between the inner and outer tubes 261 and 265 formed by the corresponding one of the flat portions 263. The reduced diameter portion 262 of the inner tube 261 forms an annular channel through which the water flows circumferentially around the inner tube 261, returning up along the other flat portion 263 and the other water transfer fitting 180 to the drain passage 228 in the docking spool body 201. More particularly, the water flows through the bore 229, across the transfer bores 236 to the bore 229a and then out through the fitting 239.

While the nozzle assembly 260 has been illustrated in connection with the welding unit 85, it will be appreciated that other styles of water-cooled welding nozzles could be used, such as the nozzle assembly 160 described above. Thus, it can be seen that it is a significant aspect of the present invention that a variety of different types of water-cooled welding nozzle assemblies can all be interchangeably mounted on the docking bodies 100 or 200, without necessitating any disconnection or other alteration of the rest of the welding system, and in particular the utilities supplies.

From the foregoing, it can be seen that there has been provided an improved welding system and a docking assembly therefor which is of simple and economical construction, and which affords simple and quick manual mounting and demounting of nozzle assemblies without the use of tools and without in any way affecting the utilities supplies, and without losing the precise positioning of the welding unit with respect to the workpiece.

I claim:

1. In an arc welding system including a tip assembly for guiding a wire electrode to an associated workpiece at a welding station and applying welding voltage to the electrode, a fluid-cooled nozzle assembly surrounding the tip assembly for channeling a shielding gas to the welding arc, and utilities delivery means for delivering to the welding station utilities such as welding voltage, arc shielding gas, consumable wire electrode and cooling fluid, a quick connect and disconnect docking assembly comprising: a docking body disposed at the welding station and having utilities passages therethrough, means connecting said docking body to the associated utilities delivery means and receiving the wire electrode and the fluid utilities into said passages, an output fixture carried by said docking body and communicating with selected ones of said passages for passing consumable wire electrode and shielding gas from said docking body, means on said output fixture for removably mounting the tip assembly thereon in a use configuration receiving the wire electrode into the tip assembly with said output fixture providing an electrical connection between said docking body and the tip assembly, first coupling means on said docking body, second coupling means non-removably mounted on the nozzle assembly and forming a permanent part thereof, said first and second coupling means being manually removably engageable with each other without the use of tools for mounting the nozzle assembly on said docking body in a mounted condition in surrounding relationship with the tip assembly for receiving the shielding gas and the cooling fluid, and means electrically insulating said docking body from the nozzle assembly in its mounted condition, whereby the nozzle assembly can readily be mounted and demounted at the welding station without affecting the utilities delivery means upstream of the welding station.

2. The docking assembly of claim 1, wherein said connecting means releasably connects said docking body to the associated utilities delivery means.

3. The docking assembly of claim 1, wherein said first coupling means includes a threaded portion on said docking body and said second coupling means includes a member threadedly engageable with said threaded portion.

4. The docking assembly of claim 1, wherein said first coupling means includes receptacle means communicating with ones of said passages other than said selected ones, said second coupling means including plug-type fittings respectively receivable in said receptacles.

5. The docking assembly of claim 1, and further including valve means disposed in ones of said passage other than said selected ones for movement between a normal closed condition preventing flow of cooling fluid therethrough and an open condition permitting flow of cooling fluid therethrough, bias means resiliently urging said valve means to the closed condition thereof, and actuator means carried by the nozzle assembly for actuating said valve means to the open condition thereof when said nozzle is in the mounted condition thereof.

6. The docking assembly of clam 5, wherein said first coupling means includes receptacle means communicating with ones of said passages other than said selected ones, said valve means and said bias means being disposed in said receptacle means, said second coupling means including plug-type fittings respectively receivable in said receptacles, said actuator means being carried by said fittings.

7. The docking assembly of claim 1, wherein said docking body is electrically connected to the source of welding voltage, and further including means electrically insulating the nozzle assembly form said docking body and the tip assembly.

8. The docking assembly of claim 1, wherein said docking body has a longitudinal axis, said connecting means extending substantially parallel to said axis.

9. The docking assembly of claim 1, wherein said docking body has a longitudinal axis, said connecting means including portions which extend substantially perpendicular to said axis.

10. Docking apparatus comprising a docking body having a plurality of passages extending therethrough, a plurality of input connectors carried by said body at one end thereof and respectively communicating with said passages, an output fixture carried by said body at the other end thereof and communicating with selected ones of said passages, first coupling means on said output fixture, and second coupling means on said body at said other end thereof, said second coupling means including an externally threaded portion on said docking body.

11. The docking apparatus of claim 10, wherein said docking body is formed of metal and is of unitary one-piece construction.

12. The docking apparatus of claim 10, wherein said docking body is substantially circularly cylindrical in shape.

13. The docking apparatus of claim 12, wherein said input connectors extend substantially parallel to the axis of said docking body.

14. The docking apparatus of claim 12, wherein all but one of said input connectors extend substantially perpendicular to the axis of said docking body.

15. The docking apparatus of claim 10, wherein said externally threaded portion is coaxial with said output fixture and spaced radially outwardly therefrom.

16. The docking apparatus of claim 15, wherein said second coupling means includes receptacle means communicating with selected ones of said passages.

17. The docking apparatus of claim 10, and further including valve means disposed in at least one of said passages other than said selected ones for movement between a normal closed condition preventing flow of fluid therethrough and an open condition permitting flow of fluid therethrough, and bias means resiliently urging said valve means to the closed condition thereof.

18. In an arc welding system adapted to be carried by a movable support at a welding station and including a tip assembly for guiding a wire electrode to an associated workpiece and applying welding voltage to the electrode, a fluid-cooled nozzle assembly surrounding the tip assembly for channeling a shielding gas to the welding arc, and utilities delivery means for delivering to the welding station utilities such as welding voltage, arc shielding gas and consumable wire electrode, a quick connect and disconnect docking assembly comprising: a docking body having utilities passages therethrough, mounting means on the movable support for mounting said docking body thereon in a welding position, positioning means on said docking body engageable with said mounting means accurately to position said docking body in its welding position with respect to the movable support, means connecting said docking body to the associated utilities delivery means and receiving the wire electrode and the fluid utilities into said passages, an output fixture carried by said docking body and communicating with selected ones of said passages for passing consumable wire electrode and shielding gas from said docking body, means on said output fixture for removably mounting the tip assembly thereon in a use configuration receiving the wire electrode into the tip assembly with said output fixture providing an electrical connection between said docking body and the tip assembly, first coupling means on said docking body, second coupling means non-removably mounted on the nozzle assembly and forming a permanent part thereof, said first and second coupling means being removably engageable with each other for mounting the nozzle assembly on said docking body in a mounted condition in surrounding relationship with the tip assembly for receiving the shielding gas and the cooling fluid, and means electrically insulating said docking body from the nozzle assembly in its mounted condition, whereby the nozzle assembly can readily be mounted and demounted at the movable support without affecting the utilities delivery means upstream of the movable support.

19. The docking assembly of claim 18, wherein said mounting means includes a circular socket or receptacle for removably receiving said docking body therein, said docking body being substantially in the form of a circular cylinder.

20. The docking assembly of claim 19, wherein said positioning means includes an annular ring fixedly secured to said docking body and extending radially outwardly therefrom for engagement with said mounting means to limit the depth of insertion of said docking body in said receptacle.

* * * * *